United States Patent [19]

Morrone et al.

[11] 4,413,750

[45] Nov. 8, 1983

[54] CHIP DISPENSER

[76] Inventors: John J. Morrone; Mary J. Morrone, both of 114 Payson Ave., Audubon, N.J. 08106

[21] Appl. No.: 278,521

[22] Filed: Jun. 29, 1981

[51] Int. Cl.[3] .............................................. B65G 59/06

[52] U.S. Cl. .................................... 221/263; 133/5 A

[58] Field of Search ............... 221/263, 276, 264, 265, 221/266; 133/5 A, 5 B, 6

[56] References Cited

U.S. PATENT DOCUMENTS

| | | | |
|---|---|---|---|
| 2,191,928 | 2/1940 | McVicker | 221/143 |
| 2,458,319 | 1/1949 | Uhing | 221/264 X |
| 2,551,493 | 5/1951 | Jenks | 133/5 |
| 2,691,379 | 10/1954 | Foushee | 133/5 |
| 2,719,528 | 10/1955 | Gabrielsen | 133/5 |
| 3,040,617 | 6/1962 | Rankin | 88/14 |
| 3,115,992 | 12/1963 | Menolasino et al. | 221/264 |
| 3,191,588 | 6/1965 | Thew | 221/271 X |
| 3,467,277 | 9/1969 | Tolliver | 221/264 |
| 3,934,753 | 1/1976 | Curtiss | 221/93 |
| 4,146,151 | 3/1979 | Davis | 221/264 |
| 4,216,878 | 8/1980 | Naud | 221/264 |

*Primary Examiner*—Stanley H. Tollberg
*Attorney, Agent, or Firm*—Seidel, Gonda & Goldhammer

[57] ABSTRACT

A chip dispenser, such as a bingo chip dispenser, comprises a supply tube for a stack of chips which is connected to a body having a chamber which houses a dispensing member. The chips are dispensed through a bore in the body of the dispenser. The dispensing member is a crescent-shaped member having two horns. The distance between the tip of one of the horns and an opposed side wall of the chamber is less than the diameter of a chip, so that the chip is prevented from being dispensed when the dispensing member is in a ready position. In the dispensing position, the dispensing member is pivoted so that the distance between the chip of the one horn and the opposed side wall is greater than the diameter of the chip and the chip is moved to a position over the bore so that the chip falls through the bore and is dispensed.

7 Claims, 6 Drawing Figures

CHIP DISPENSER

BACKGROUND OF THE INVENTION

This invention relates to a device for dispensing chips in the form of flat discs, one at a time, and more particularly, a hand held chip dispenser.

The primary although not exclusive purpose intended for this invention is as a bingo chip dispenser. In the game of bingo, the game card consists of a number of squares with random numbers under lettered columns. Since the object of bingo is to cover the squares in a predetermined pattern, based on the column letter and number called at random, players frequently try to enhance their chances of winning by playing several cards at one time. This not only requires quick thinking and good observation powers, but also demands the accurate placement of the bingo chips on the appropriate squares.

The hand held dispenser of the present invention provides for the positive dispensing of a series of chips, one at a time, in a reliable manner. The dispenser is easy to handle and allows for the rapid, accurate placement of chips in the locations desired.

U.S. Pat. No. 4,146,151 of Davis, issued Mar. 27, 1979, discloses a bingo chip dispenser in which chips are dispensed one at a time from a supply tube by a laterally reciprocating slide ring. The slide ring is actuated by finger pressure or by a depressible plunger having a cam surface which causes the slide to move in a lateral direction.

U.S. Pat. No. 4,216,878 of Naud, issued Aug. 12, 1980, relates to another form of bingo chip dispenser in which chips are dispensed from a supply tube, one at a time, by a reciprocating slide having a structure different from that in U.S. Pat. No. 4,146,151.

It is believed that the use of a reciprocating slide is not as efficient and more prone to jamming than the actuating mechanism of the present invention.

U.S. Pat. No. 2,551,493 of Jenks, issued May 1, 1951, discloses a coin dispensing mechanism which is mounted on a vertical surface, such as the wall of a vending machine. The actuating mechanism comprises a number of pivoted actuating arms for holding the coin in an inactive position and for dispensing the coin in an active position. This apparatus uses more parts and is more complicated than the dispenser of the present invention. The dispenser of the present invention is believed to provide a more positive and reliable dispensing operation than the apparatus of U.S. Pat. No. 2,551,493.

SUMMARY OF THE INVENTION

The present invention concerns a hand held chip dispenser comprising a body, a chamber within the body, the chamber having a lower wall and a side wall formed by a ledge extending upwardly from the lower wall, a bore passing downwardly through the body, a bore inlet being formed in the lower wall of the chamber a bore outlet being formed at the bottom of the body, a cowl connected to the body adjacent to the ledge, a wall of the cowl being generally parallel to the lower wall of the chamber and forming an upper wall of the chamber, the cowl having a generally vertical opening extending therethrough and being offset with respect to the bore inlet, a chip supply means associated with the cowl whereby a chip adapted to be dispensed passes through the cowl, and a crescent-shaped dispensing member having first and second horns pivotably disposed within the chamber, the dispensing member being biased by a biasing means to a ready position in which the distance between the tip of the first horn of the dispensing member and an opposed side wall of the chamber is less than the diameter of a chip adapted to be dispensed so as to prevent the chip from being dispensed, the dispensing member having an actuating means for pivoting the dispensing member to a dispensing position wherein the distance between the tip of the first horn and the opposed side wall is greater than the diameter of the chip and the chip is moved to a position over the bore inlet by the second horn.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE PREFERRED EMBODIMENTS

Figure 1:
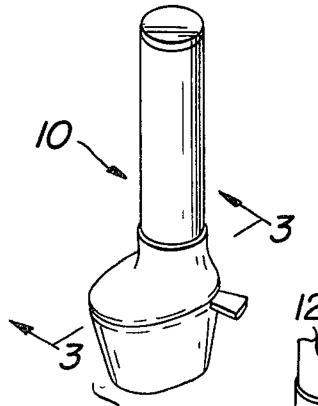
FIG. 1 is a perspective view illustrating a preferred embodiment of the present invention.

Referring to the drawings in detail, wherein like numerals indicate like elements throughout the several figures, there is shown in FIG. 1 a preferred embodiment of a disc or chip dispenser 10 in accordance with the present invention. This embodiment is illustrated in more detail in FIGS. 2, 3 and 4.

Dispenser 10 includes a supply tube 12 with an optional cap 14. Cap 14 may be removably secured to tube 12 by a friction fit, bayonet lock, or any other suitable connection. Supply tube 12 contains a supply of chips 16 stacked vertically within the tube. A partial stack of chips 16 is illustrated in phantom in FIG. 3.

Figure 5:
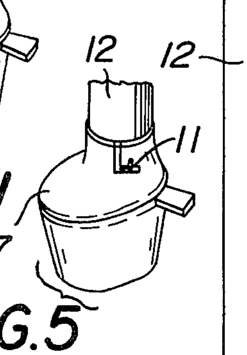
FIG. 5 is a perspective view illustrating another embodiment in which the chip supply tube is attached to the cowl by a bayonet lock connection.
Figure 2:
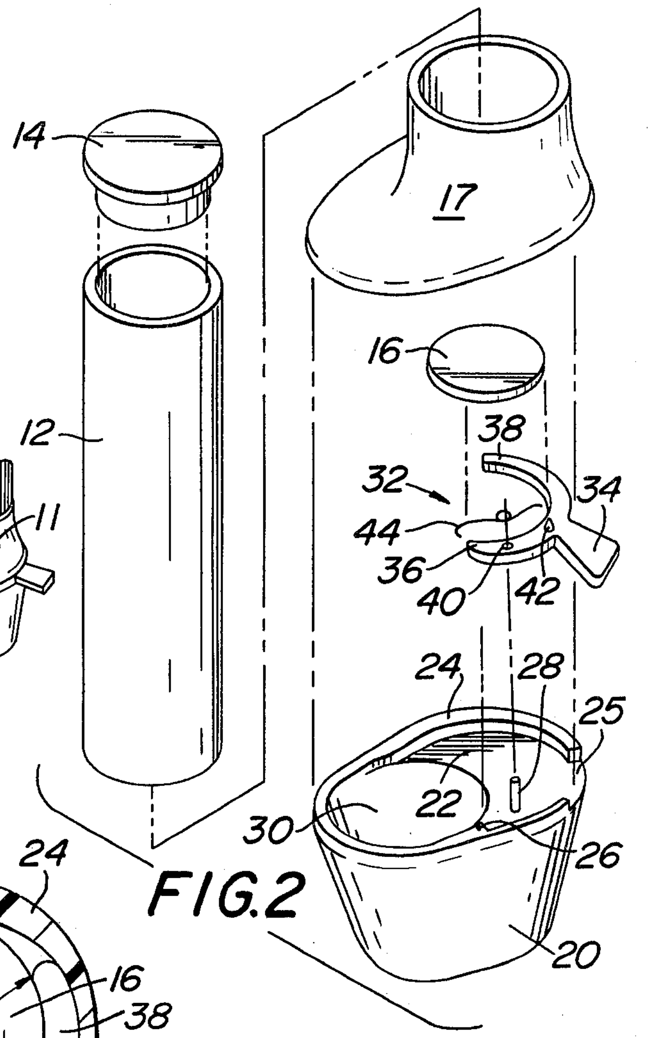
FIG. 2 is an exploded perspective view of the embodiment of the present invention illustrated in FIG. 1 showing the relationship of the component parts.
Figure 6:
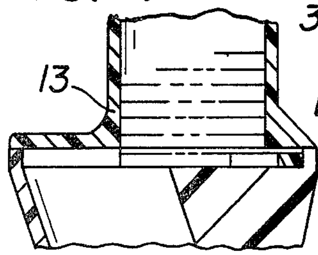
FIG. 6 is a partial sectional view similar to FIG. 3 of another embodiment in which the chip supply tube is formed integrally with the cowl.
Figure 3:
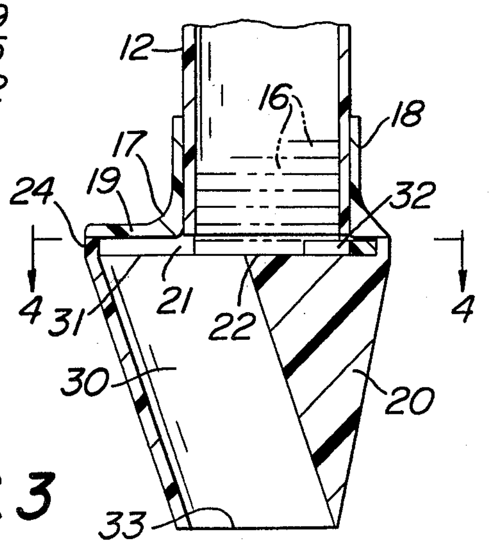
FIG. 3 is a sectional view of a preferred embodiment of the present invention taken along lines 3—3 of FIG. 1.

As illustrated in FIGS. 2 and 3, tube 12 fits within the opening in a cowl 17. Cowl 17 has a generally vertical, annular portion 18 defining the opening for tube 12. In the embodiment illustrated, tube 12 is removably associated with cowl 17 and is retained in cowl 17 by a friction fit. Alternate means of removably attaching tube 12 to cowl 17 may be used, such as a bayonet lock 11 as illustrated in FIG. 5, in which a pin on the tube is inserted within a slot on the cowl. By having tube 12 removably associated with cowl 17, a number of tubes filled with chips can be substituted readily when the supply tube in use has been emptied. However, if desired, tube 12 may be integrally formed with cowl 17 in a one piece tube and cowl assembly 13, as illustrated in FIG. 6, for example. Further, the tube may be bonded to the cowl by means of any suitable adhesive.

Cowl 17 is attached to a body 20 of the dispenser. The cowl can be attached to the body by fasteners such as screws or by any suitable adhesive. Body 20 is preferably trapezoidal in cross-section (see FIG. 3). Body 20 includes a bore 30 having a bore inlet 31 at the top thereof and a bore outlet 33 at the bottom thereof.

A chamber 21 (see FIG. 3) is located within body 20. Chamber 21 is defined by lower wall 22 and a side wall which comprises a ledge 24 extending upwardly from lower wall 22. A horizontal wall 19 of cowl 17, generally parallel to lower wall 22, forms a top wall for chamber 21. Bore inlet 31 is located in a position offset with respect to the opening in cowl 17. This is so the chip about to be dispensed is supported by lower wall 22. Ledge 24 contains a recess 25 for the trigger of a dispensing member 32 to be described hereinafter.

The chip is dispensed as set forth hereinafter through bore 30. It is preferred that bore 30 be angled with respect to the vertical as illustrated in FIG. 3 so that bore outlet 33 is directly below supply tube 12 and the opening in cowl 17. This is so that the chips will not be dispensed at a location offset from the vertical compared to the supply tube. This arrangement facilitates accurate chip placement.

A crescent-shaped dispensing member 32 is disposed within chamber 21. Crescent-shaped dispensing member 32 comprises integral portions including a first horn 36, a second horn 38, and a trigger 34. The thickness of dispenser member 32 is less than the thickness of chip 16 so that only one chip is dispensed at one time and so that the dispensing member does not jam when it is being actuated.

Dispensing member 32 includes a hole 40 by which the dispensing member pivots about a pin 28 extending upwardly from lower wall 22 of chamber 21 formed in body 20. A spring 44 is looped or coiled around pin 28. One end of spring 44 bears against and is retained by a retaining means in the body, such as slot 26. The other end of spring 44 bears against a protrusion 42 extending from dispensing member 32. With this arrangement, spring 44 biases dispensing member 32 to the position illustrated in FIG. 4.

Figure 4:
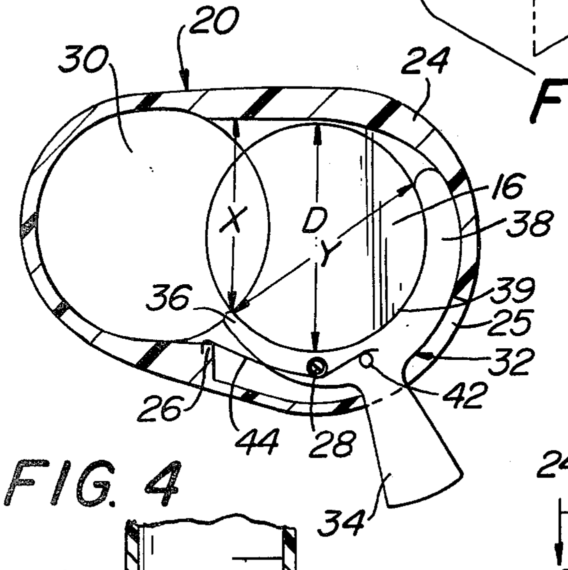
FIG. 4 is a sectional view of a preferred embodiment of the present invention taken along lines 4—4 of FIG. 3.

In the ready position illustrated in FIG. 4, the distance X between the tip of horn 36 and the opposed side wall 24 of the chamber is less than the diameter D of the chip. Thus, dispensing member 32 retains chip 16 in a position such that it is held between first horn 36 of dispensing member 32 and an opposed portion of ledge 24 forming the side wall of chamber 21. It is important that the dispenser be capable of retaining the chip in this position so that the chip is not accidentally dispensed, either during the playing of the game or when the dispenser is being transported with chips in it. The dispensing member 32 is urged or biased in this ready position by spring 44.

The distance Y between the tip of horn 36 and the tip of horn 38 of dispensing member 32 must be greater than the diameter D of chip 16. Stated another way, the radius of the arc formed by the inner surface 39 between the tip of horn 36 and the tip of horn 38 must be greater than radius of the chip. Moreover, the inner surface 39, which connects the tip of horn 36 with the tip of horn 38, must be located in chamber 21 so that chip 16 can fit within the arc formed by horns 36 and 38 without interference when the dispensing member is in the ready position. It is preferred that the distance Y and the radius of the arc between horns 36 and 38 be only slightly greater than the diameter D or radius of chip 16 so that the chip will easily fall into position on lower wall 22 of chamber 21, yet be sufficiently retained between horn 36 and the portion of the side wall opposed to horn 36 so that it cannot be inadvertently dispensed without pressing trigger 34 of dispensing member 32.

When it is desired to dispense a chip from the dispenser, trigger 34 is pushed by the user's finger or thumb either in a counterclockwise direction with respect to FIG. 4 or directly inwardly toward the center of body 20 of the dispenser. This will cause dispensing member 32 to pivot about pin 28. When this occurs, the distance X between the tip of horn 36 and the opposed side wall 24 becomes greater than the diameter D of chip 16 and horn 38 pushes chip 16 over bore inlet 31. It should be apparent that the diameter of bore 30 must be greater than the diameter of chip 16.

When trigger 34 is being pressed to dispense one chip 16, the next successive chip within tube supply 12 is supported by the upper surface of dispensing member 32. When the pressure on trigger 34 is released and the dispensing member 32 returns to its ready position as illustrated in FIG. 4, the chip about to be dispensed is no longer supported by the upper surface of dispensing member 32, but is supported by lower wall 22 of chamber 21. The dispensing cycle then begins again.

The present invention may be embodied in other specific forms without departing from the spirit or essential attributes thereof and, accordingly, reference should be made to the appended claims, rather than to the foregoing specification, as indicating the scope of the invention.

We claim:

1. A hand held chip dispenser comprising:

a body, a chamber within the body, the chamber having a lower wall and a side wall formed by a ledge extending upwardly from the lower wall, a bore passing downwardly through the body, a bore inlet being formed in the lower wall of the chamber, a bore outlet being formed at the bottom of the body, a cowl connected to the body adjacent to the ledge, a wall of the cowl being generally parallel to the lower wall of the chamber and forming an upper wall of the chamber, the cowl having a generally vertical opening extending therethrough and being offset with respect to the bore inlet, a chip supply means associated with the cowl whereby a chip adapted to be dispensed passes through the cowl, and a single crescent-shaped dispensing member having first and second horns pivotably disposed within the chamber, the dispensing member being biased by a biasing means to a ready position in which the distance between the tip of the first horn of the dispensing member and an opposed side wall of the chamber is less than the diameter of a chip adapted to be dispensed so as to prevent the chip from being dispensed, the dispensing member having an actuating means for pivoting the dispensing member to a dispensing position wherein the distance between the tip of the first horn and the opposed side wall is greater than the diameter of the chip and the chip is moved to a position over the bore inlet by the second horn.

2. A chip dispenser according to claim 1 wherein the bore is angled such that the bore outlet is substantially directly below the opening in the cowl.

3. A chip dispenser according to claim 1 wherein the supply tube is detachably associated with the cowl.

4. A chip dispenser according to claim 3 wherein the supply tube is lockable into the cowl by a bayonet lock.

5. A chip dispenser according to claim 1 wherein the supply tube is integrally formed with the cowl.

6. A chip dispenser according to claim 1 wherein the dispenser member pivots aout a pivot point extending through the first horn.

7. A chip dispenser according to claim 1 wherein the biasing means is a coil spring, one end of the spring bearing against the body and the other end of the spring bearing against the dispensing member, the coil portion of the spring being wound around a pin extending from the lower wall which serves as the pivot point for the dispensing member.

* * * * *